June 20, 1967 H. L. RATLIFF, JR 3,326,106

APPARATUS FOR RECORDING WIDE-ANGLE STEREOSCOPIC PICTURES

Filed Aug. 30, 1965 3 Sheets-Sheet 1

INVENTOR.

Harvey L. Ratliff Jr.

June 20, 1967 H. L. RATLIFF, JR 3,326,106

APPARATUS FOR RECORDING WIDE-ANGLE STEREOSCOPIC PICTURES

Filed Aug. 30, 1965 3 Sheets-Sheet 2

INVENTOR.

INVENTOR.

Harvey L. Ratliff Jr.

United States Patent Office 3,326,106

Patented June 20, 1967

3,326,106

APPARATUS FOR RECORDING WIDE-ANGLE STEREOSCOPIC PICTURES

Harvey L. Ratliff, Jr., Oxon Hill, Md., assignor to Jetru Inc., Amarillo, Tex.

Original application Feb. 1, 1965, Ser. No. 429,316. Divided and this application Aug. 30, 1965, Ser. No. 483,728
2 Claims. (Cl. 95—18)

ABSTRACT OF THE DISCLOSURE

There is a means 39 of placing a right real image 32 and a left virtual image 34′ upon an object plane 41 with the picture centers thereof substantially separated. There is a means 36 or 36′ of focusing the images at 41 upon an image plane 40 wherein the image has three portions: a central portions 28, a right side portion 27 and a left side portion 29. There is a means of separably focusing and recording the central portion 28. Therefore, a picture is produced that can be viewed in a viewer such as described in U.S. Patent 3,272,069 to produce a wide-angle re-creation without viewing a strip between the left and right eye views.

This application is a divisional application of my copending prior application Ser. No. 429,316 filed Feb. 1, 1965.

A brief summary of the invention is as follows:

The present invention relates generally to apparatus for recording wide-angle stereoscopic pictures from images at an enlarged object plane.

As described in my copending application 429,317, now U.S. aPtent 3,251,284 (which had the same original disclosure as the parent case hereof), it is desirable at times to perform certain manual operations upon wide-angle pictures and to then record them such as to be viewable in a viewer similar to that most pointedly described in my U.S. Patent 3,272,069 but also described in the parent hereof, from an enlarged object plane.

It is the primary object of the present invention to accomplish this.

Figure 1:
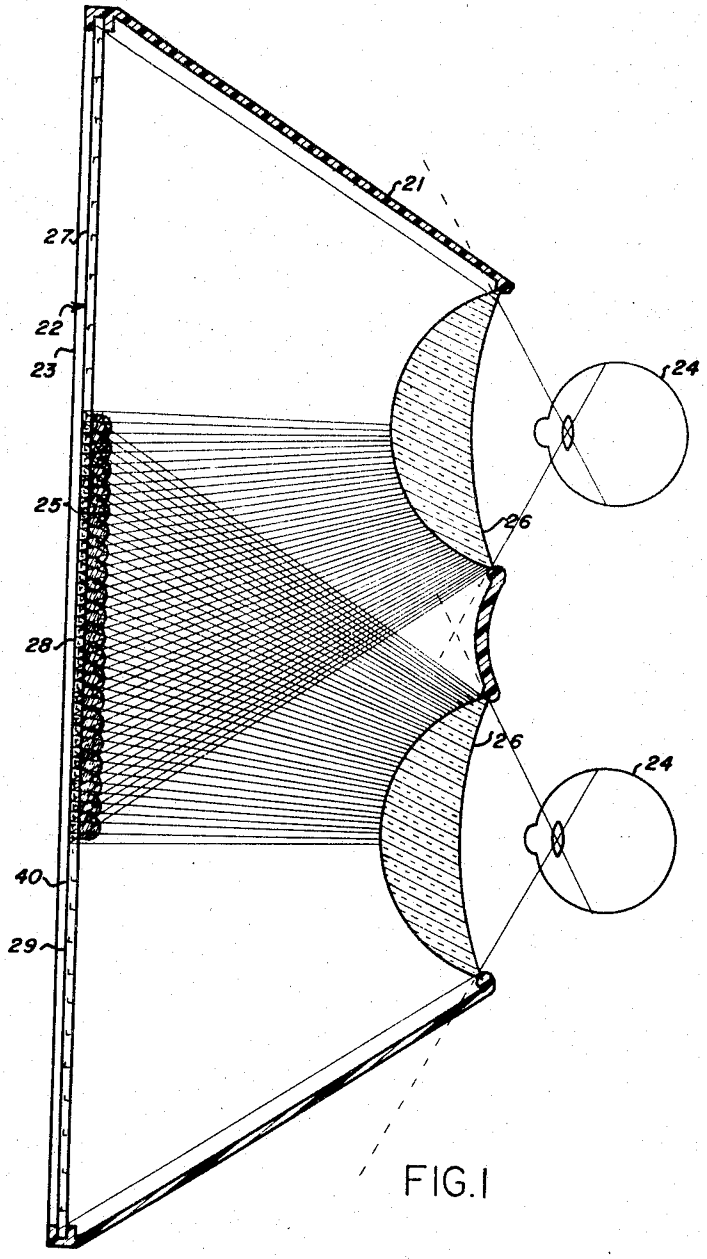

Other objects and advantages of my invention will become more apparent from a study of the following description taken with the accompanying drawings wherein:

FIG. 1 diagrammatically illustrates apparatus which is usable to enable a person to view the end product of the present invention with one form of the end product mounted therein.

Figure 2:
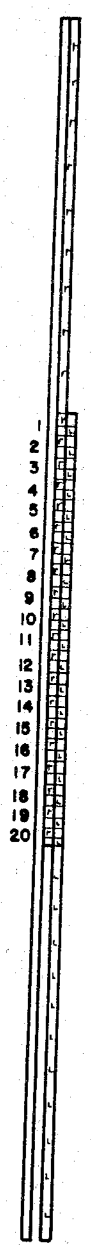

FIG. 2 illustrates another form the end product of the present invention may take.

Figure 3:
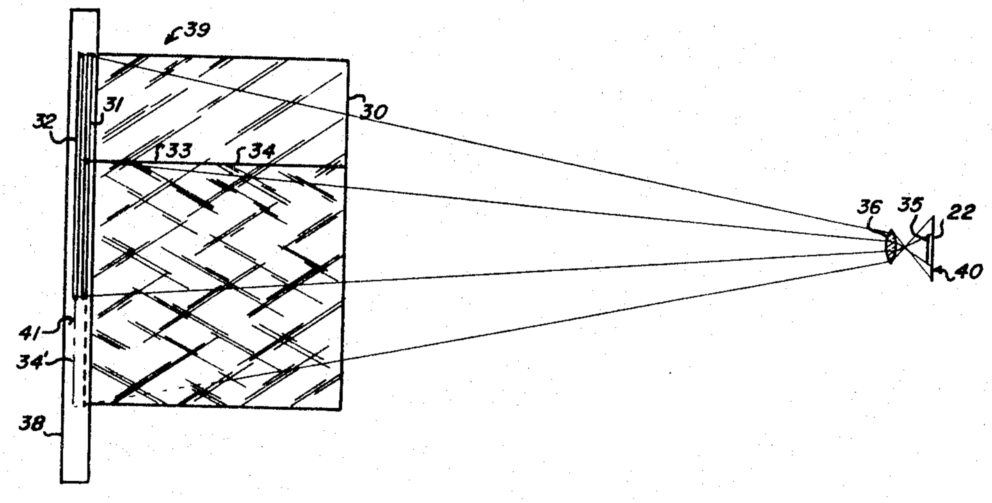
Figure 4:
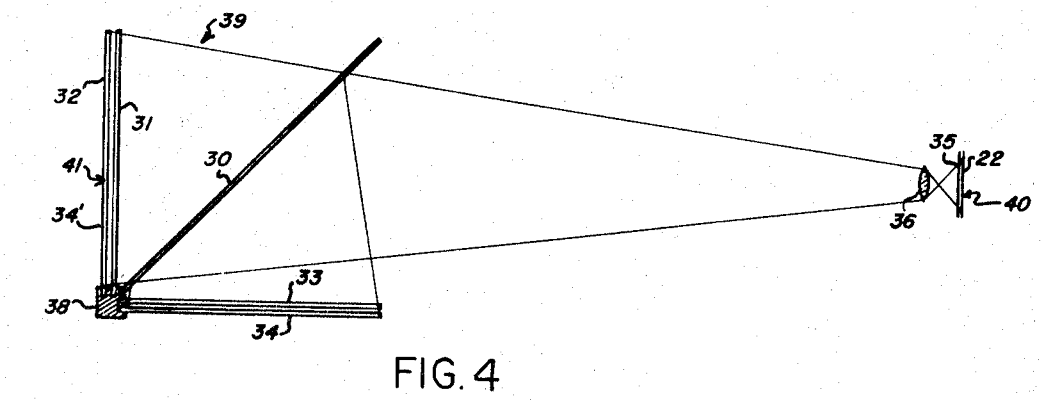

FIGS. 3 and 4 diagrammatically illustrate one form of the contemplated apparatus to practice the invention.

Figure 5:
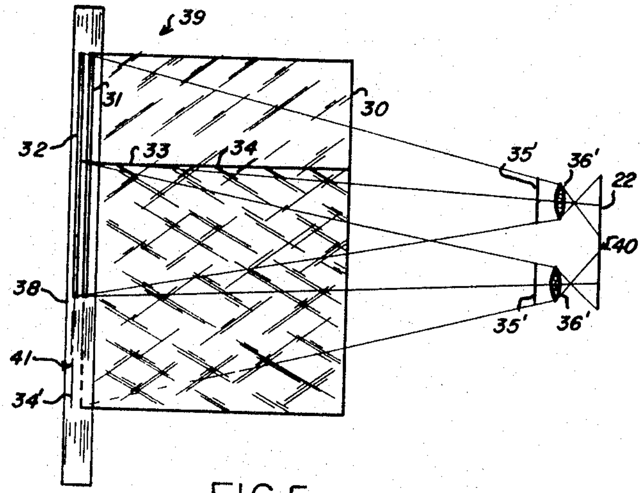

FIG. 5 diagrammatically illustrates another form of the contemplated apparatus to practice the invention.

Figure 6:
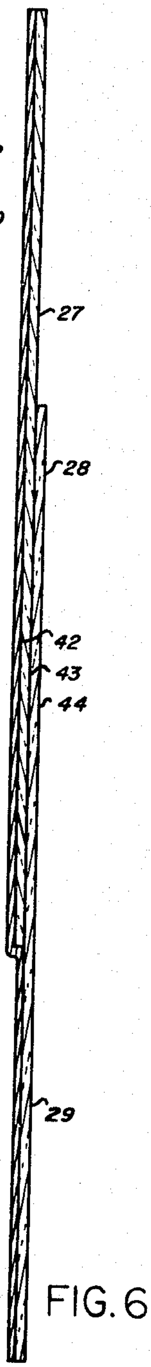

FIG. 6 illustrates another form the end product of the present invention may take.

Figures 7, 8:
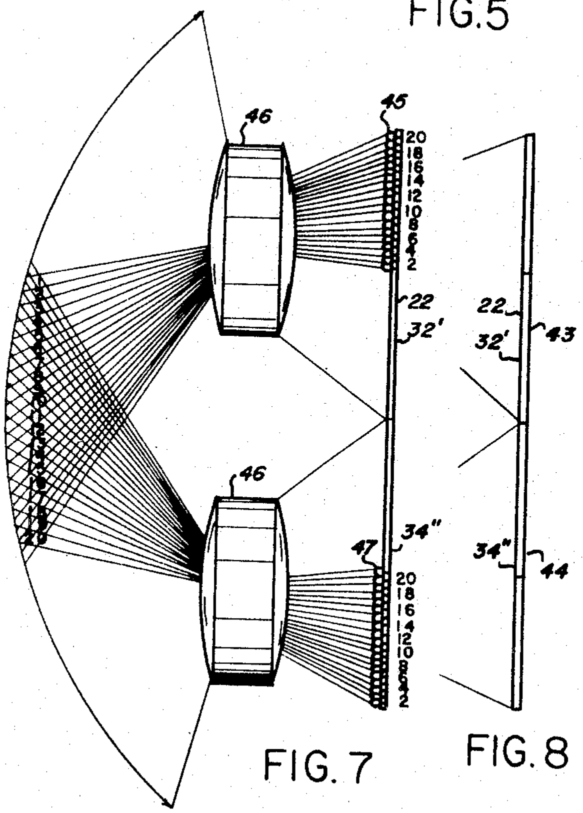

FIGS. 7 and 8 diagrammatically illustrate apparatus for producing an end product other than that of the present invention which is interchangeable with that of the present invention in that it can be viewed in the same type viewing device.

Reference is now made to FIGS. 3 and 4. There is a means 39 of placing a real right and a virtual left eye view image 32 and 34′ respectively upon an object plane 41 whereby the picture center of 32 is substantially displaced to the right of the picture center of 34′ and the images upon plane 41 comprise three parts: the part (to the left of 32) containing only a virtual wide-angle image 34′ (the real image 34 is horizontal as shown in FIGS. 3 and 4, but semi-transparent mirror 30, which makes a 45° angle with both this horizontal plane (of 34) and the object plane 41, as shown, places the virtual image 34′ of real image 34 upon object plane 41), the part (to the right of 34′) containing only a real wide-angle image 32, and the central part (to the left of the right edge of 34′ and the right of the left edge of 32) containing both the virtual wide-angle image 34′ and the real wide-angle image 32.

There is a means 36, which is a camera lens system, for focusing the images 32 and 34′ upon an image plane 40, which has a central portion 28 (corresponding to the above-described "central part") behind 35 and two side portions 27 and 29 (corresponding to the above-described parts "to the right of 34′" and "to the left of 32"), see also FIG. 1, with the right and left picture centers approximately the same distance apart as the optical axes of oculars 26 of the device of FIG. 1 which will be described in greater detail hereinafter.

There is a means 31, 33 and 35 between planes 41 and 40 operating upon the rays from the central part of 41 (to the left of the right edge of 34′ and the right of the left edge of 32), whereby there is separately focused (i.e., in alternate conjugate strips, R and L, as shown in central portion 28 of FIG. 1 or in a well known polarizing manner as shown in central portion 28 of FIG. 6 and more completely described in my above cited Patent 3,272,069) both a right wide-angle picture of the right wide-angle object plane image 32 and a left wide-angle picture of the left wide-angle object plane image 34′ upon the central portion 28 (behind 35) of the image plane picture at 40. This means between 40 and 41 is specifically contemplated to be vertical polarizing sheet 31 overlying image 32, as shown, horizontal polarizing sheet 33 overlying image 34 (not 34′ but between it and 40), as shown, to give the rays from 32 a different axis of polarization from the rays from 34′, and analyzing sheet 35 which is made up of a multiplicity of alternate, vertical strip elements with the adjacent strips having different axes of polarization whereby one group of strips will pass rays from 32 and the adjacent strips will pass rays from 34′. However, the means between 40 and 41 to provide the function, such as separable R and L strips as on 40 of FIG. 1, could be any obvious equivalent of this.

Inherently the image thusly focused upon the image plane 40 of FIGS. 3 and 4 could be viewed directly by a device such as the one shown in FIG. 1 or recorded upon film or media 22 and placed in a viewer such as shown in FIG. 1 for viewing.

The essential features of the viewer to view the end product of the present invention are shown in FIG. 1. The viewer needs wide-angle oculars 26 which have their optical axes spaced approximately the interpupillary distance (2.56 inches) apart, as supported by some sort of housing 21, and some sort of separating means 25, i.e. a lenticular or grating screen 25 to coact with the separably focused or recorded central portion 28, i.e. the R and L strips of 28. If the images are recorded as shown in FIG. 6 hereof, a viewer which is pointedly shown in FIG. 4 of said 3,272,069 and described in the parent case hereof or its equivalent will be needed, using analyzers such as M and N of 3,272,069.

In an alternative system of FIG. 5 two lens systems 36′ are used with their respective optical axes passing through the picture centers of 32 and 34′. Therefore, 27 and 29 fall on the inside of the respective right and left pictures at 40 (since they are inverted) and both 28 fall on the outside thereof. As before, 27 represents the area to the right of 34′, 29 represents the area to the left of 32, and 28 represents the area between the right edge of 34′ and the left edge of 32.

In this system analyzers 35′ are placed between means 36′ and means 39, and means 39 is as described herein-above for FIGS. 3 and 4. The images at 40, in the case of FIG. 5, are recorded on a well known form of polarizing film 22 (of FIG. 5) and are inverted and overlapped by obvious means as shown in FIG. 6 with both the 28 portions falling in the center where they should and the 27 and 29 portions falling on the respective sides where they should. For more details of the operative principles of this picture see said Patent 3,251,284, wherein r.s., v.p. and h.p. therein correspond to 42, 43 and 44 herein, and for how this picture is viewed see said Patent 3,272,069, FIG. 4.

As described in said 3,251,284 (see the description of FIGS. 24, 25, and 26 therein) the pictures produced by the present system are interchangeable with the pictures produced by a wide-angle stereoscopic system recording scenes directly from nature comprising wide-angle lenses 46, separable recording means 45 and film 22. (For more details see 3,251,284 wherein f.r., f.l., r.r., r.l., f., r.e.v., l.e.v., v.p., h.p., FIG. 24, FIG. 25, and FIG. 26 thereof correspond to 46, 46, 45, 45, 22, 32', 34'', 43, 44, FIG. 7, FIG. 2, and FIG. 8 hereof respectively.

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

I claim:

1. Apparatus for focusing for recording wide-angle stereoscopic composite pictures to be viewed at substantially the focal plane of wide-angle oculars having relatively short focal lengths and optical axes approximately the interpupillary distance apart with a means between the oculars and their focal plane to separate respective right and left eye views in a central portion of their focal plane comprising:

first means for placing right and left eye view images upon an object plane whereby the right eye view image picture center is substantially displaced to the right of the left eye view image picture center and the images upon said object plane comprise three parts: a first part containing only a virtual wide-angle picture image of one eye view, a second part containing only a real wide-angle picture image of the other eye view and a central part containing both a virtual wide-angle picture image of the one eye view and a real wide-angle picture of the other eye view;

second means for focusing the images at said object plane upon an image plane with the right and left picture centers approximately the same distance apart as the optical axes of said oculars at said focal plane of said oculars;

third means between said object plane and said image plane operating upon the rays from said central part of the object plane whereby there is separately focused both a right wide-angle picture of the right eye view object plane image and a left wide-angle picture of the left eye view object plane image upon the central portion of the image plane picture;

thus producing a wide-angle stereoscopic composite picture from the object plane picture with the right and left images separable in the central portion as seen through said oculars and the separating means to eliminate the viewing of a strip between the left and right eye views as seen through said oculars.

2. Apparatus for recording wide-angle stereoscopic composite pictures to be viewed at substantially the focal plane of wide-angle oculars having relatively short focal lengths and optical axes approximately the interpupillary distance apart with a means between the oculars and their focal plane to separate respective right and left eye views in a central portion of their focal planes comprising:

first means for placing right and left eye view images upon an object plane whereby the right eye view image picture center is substantially displaced to the right of the left eye view image picture center and the images upon said object plane comprise three parts: a first part containing only a virtual wide-angle picture image of one eye view, a second part containing only a real wide-angle picture image of the other eye view and a central part containing both a virtual wide-angle picture image of the one eye view and a real wide-angle picture image of the other eye view;

second means for focusing the images at said object plane upon an image plane about respective axes which pass substantially through the respective picture centers at said object plane and are substantially perpendicular to said object plane;

third means between said object plane and said image plane operating upon the rays from said central part of the object plane whereby there is separately focused both a right wide-angle picture of the right eye view object plane image and a left-angle picture of the left eye view object plane image upon the central portion of the image plane picture;

fourth means of separably recording both the focused images in said central portion and recording the remainder of each of the focused images in side portions upon a media with the right and left picture centers approximately the same distance apart as the optical axes of said oculars at said focal plane of said oculars;

thus producing upon said media a wide-angle stereoscopic composite picture from the object plane picture with the right and left images separable in the central portion as seen through said oculars and the separating means to eliminate the viewing of a strip between the left and right eye views as seen through said oculars.

References Cited

FOREIGN PATENTS 944,255 11/1948 France.
977,368 11/1950 France.

JOHN M. HORAN, *Primary Examiner*.